United States Patent [19]
Bridges

[11] 4,030,737
[45] June 21, 1977

[54] ADJUSTABLE MOUNTING FOR PIVOTAL WHEEL SUPPORT

[76] Inventor: Alvin C. Bridges, 1099 California Ave, Burlingame, Calif. 94010

[22] Filed: Aug. 1, 1975

[21] Appl. No.: 601,077

[52] U.S. Cl. .............................................. 280/661
[51] Int. Cl.² ....................................... B62D 17/00
[58] Field of Search ........................... 280/96.1, 661

[56] References Cited
UNITED STATES PATENTS

| 2,299,087 | 10/1942 | Goetz | 280/661 |
| 2,630,330 | 3/1953 | Long | 280/661 |
| 2,674,465 | 4/1954 | Carpezzi | 280/661 |

Primary Examiner—Joseph F. Peters, Jr.
Assistant Examiner—Terrance L. Siemens
Attorney, Agent, or Firm—George B. White

[57] ABSTRACT

This invention relates to a mounting of the pivot shaft for wheel support whereby the alignment of adjustment of vehicle wheels, in particular as to the camber, can be positively accomplished and maintained. The pivot shaft on which the pivoted arm is supported is mounted transversely in a frame of generally U-shaped cross section slidable in a box open at both ends, which latter is fixedly mounted on a bolt through the channel frame of the vehicle; the U-shaped frame for the pivot shaft has a threaded shaft extending from its base axially of the box and through a transverse plate fixed in the box and is held in place by a rotatable nut so held on the fixed plate that when the nut is turned the threaded shaft will travel through the nut and accordingly slides the U-shaped frame and the pivot shaft in the box in the direction desired for the adjustment of the wheel alignment.

7 Claims, 5 Drawing Figures

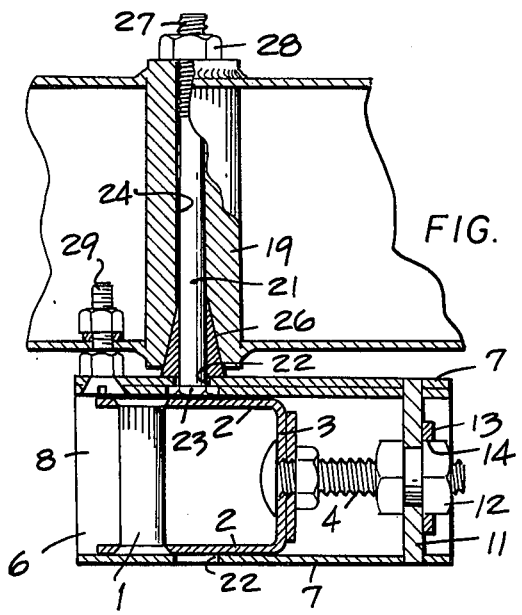
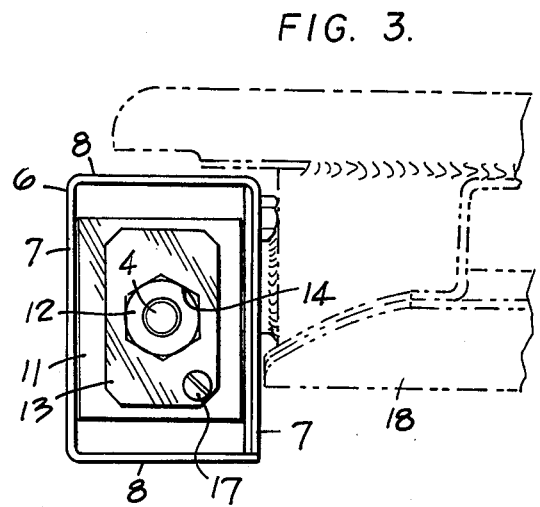
FIG. 2.
FIG. 3.
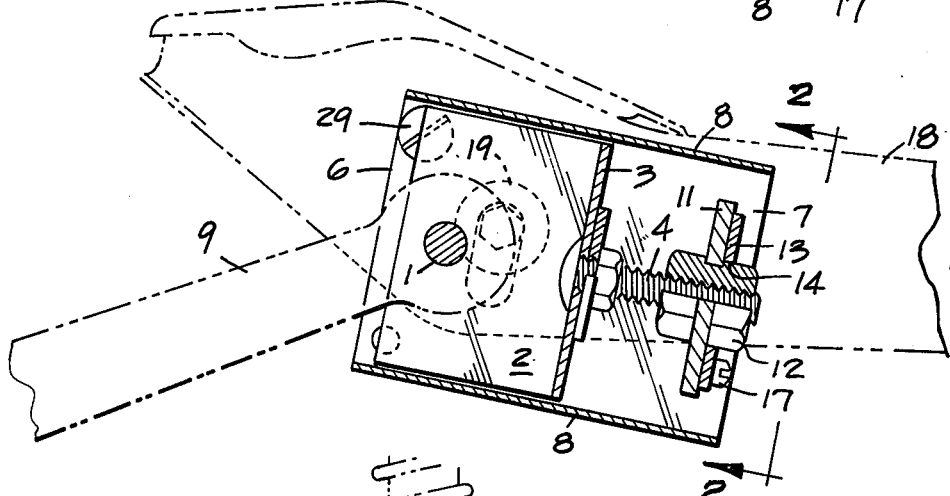
FIG. 4.
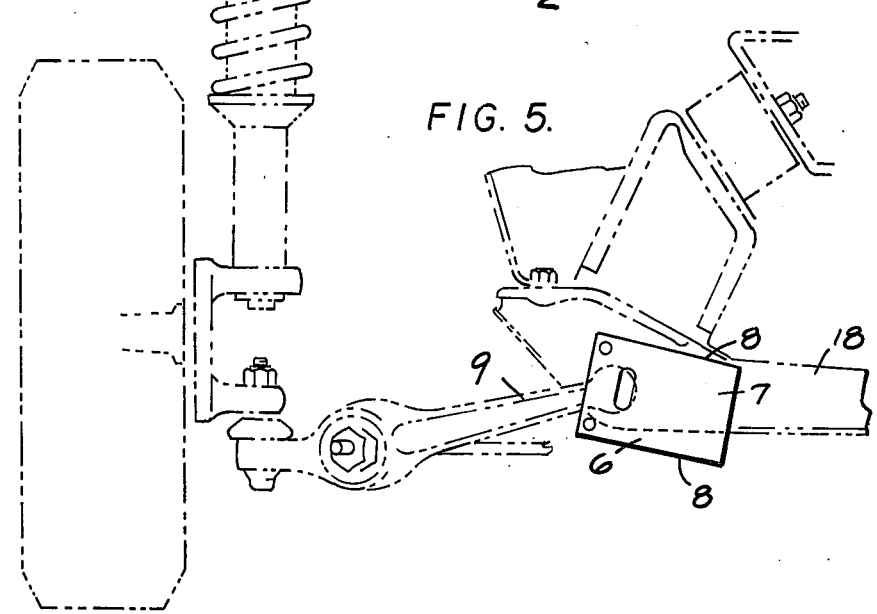
FIG. 5.

ADJUSTABLE MOUNTING FOR PIVOTAL WHEEL SUPPORT

BACKGROUND OF THE INVENTION

The herein invention is an improvement on means to adjust the support of a pivot shaft such as shown in U.S. Pat. No 3,880,444 granted to Alvin C. Bridges on Apr. 29, 1975 and the references therein cited. Adjustability of the pivotal wheel mounting was heretofore approached from the point of view of improving the mounting of the pivot shaft within the channel frame of the vehicle and then to have various devices for preventing the pivot shaft from turning when subjected to torsional forces and shocks.

The primary object of the invention is to have a positive adjustability and support of the pivot shaft outside of the hollow channel frame of the vehicle so that the location of the pivot shaft can be adjusted in either direction in an easily accessible location and wherein the pivot shaft is positively held in position on the channel frame, and where the unit can be quickly and easily mounted and replaced and adjustment can be quickly accomplished and the pivot shaft can be positively held against shifting.

BRIEF DESCRIPTION OF THE DRAWINGS

FIG. 2 is a fragmental sectional view, the section being taken on lines 2—2 of FIG. 4.

FIG. 3 is an end view showing the locking end.

FIG. 4 is a longitudinal section of the mounting.

FIG. 5 is a side view of the mounting in relation to the vehicle wheel.

DETAILED DESCRIPTION

Figure 1:
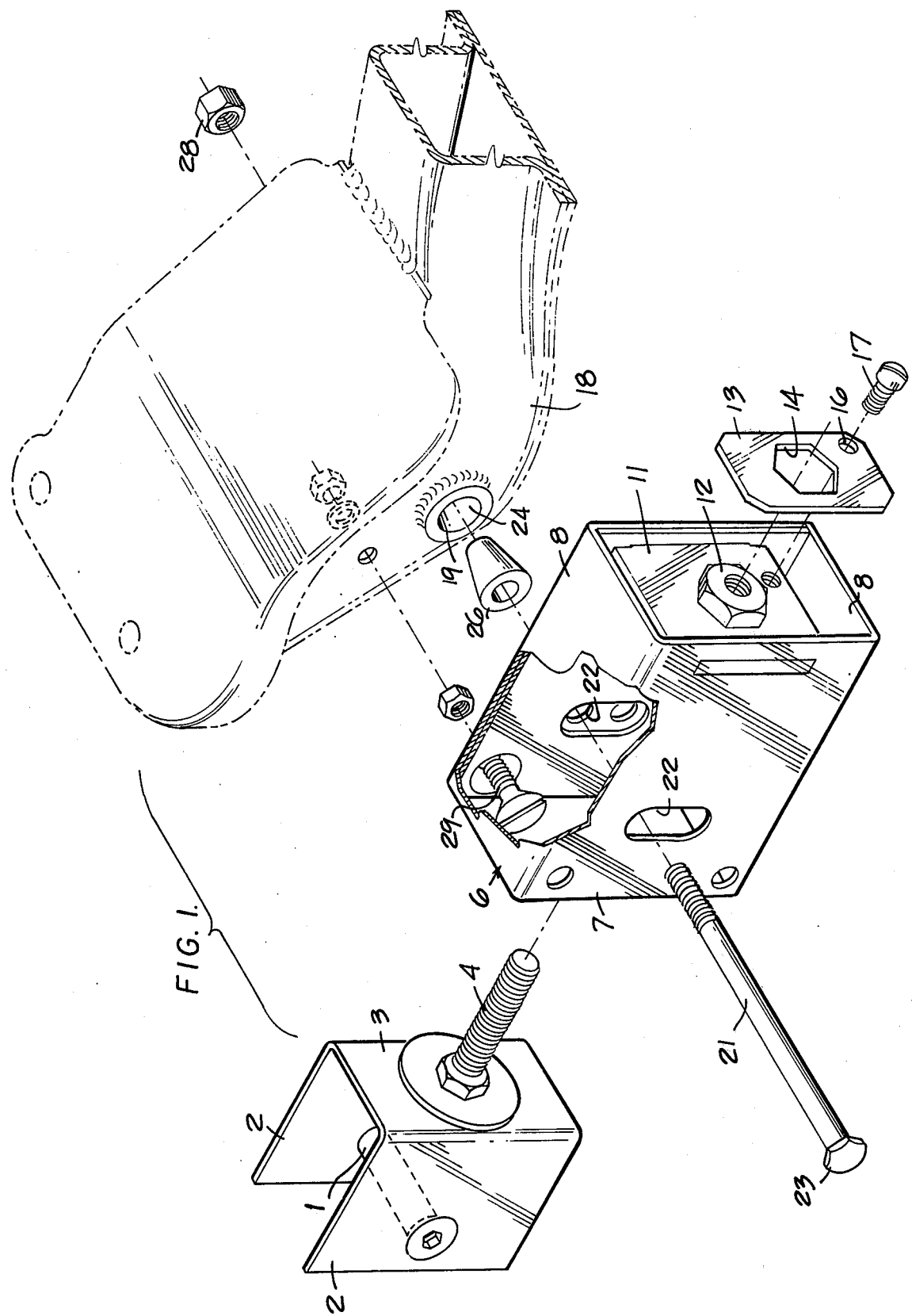
FIG. 1 is a perspective developed view of the adjustable mounting.

A pivot shaft 1 is fixedly mounted in the legs 2 of a pivot frame of U-shaped cross section, the base 3 of which has an adjusting or travelling stub shaft 4. The pivot frame is slidable in a box 6 of substantially rectangular cross section. The box 6 has perpendicular sides 7 and top and bottom walls 8. The box 6 is tubular, namely both ends are open. The usual pivoted arm 9 is pivoted on the pivot shaft 1 and extends through one open end of the box 6 for supporting the wheel of a vehicle in the usual manner.

Near the other end of the box is provided a fixed back-plate 11. A nut 12 is rotatably held in the fixed back plate 11 and it engages the travelling stub shaft 4 so that when the nut 12 is turned the stub shaft 4 travels in the respective direction thereby pulling or pushing the U-shaped pivot frame with the pivot shaft 1 therein in the box 6 in the selected direction for adjusting the location of the pivot shaft 1 according to the wheel alignment required.

The nut 12 is locked in the adjusted position by releasable means, for instance by a locking plate 13 which has therein a polygonal socket 14 fitting over the nut 12. A hole 16 in the locking plate 13 accomodates a pin or a set screw 17 fitting into the corresponding hole in the fixed back-plate 11 thereby to prevent accidental turning of the nut 12.

The above described assembly is mounted on the usual channel frame 18 of the vehicle. In a tubular member 19 extending across the channel frame 18, in which the usual pivot is presently located, is placed a bolt 21. For assembly purposes the perpendicular sides 7 of the box 6 have opposite holes 22 one of which is large enough to accomodate the head of the bolt. The hole 22 adjacent to the channel 18 is countersunk to fit the bolt head 23 and prevent it from interfering with the sliding of the pivot frame in the box 6. Inasmuch as the usual hole 24 on the channel frame adjacent to the position of the box 6 is normally larger than the bolt 21, a tapered bushing 26 is provided along the bolt 21 so as to extend into the end of the tube 19 so that the larger end of the bushing 26 is pressed into the larger hold 24 thereby to hold the bolt 21 in position. The threaded end 27 of the bolt 21 extends through the hole in the farther wall of the channel frame 18 and is held in place by the usual nut 28.

To prevent the turning of the box 6 about the bolt head 21 there is another bolt 29 provided near the end of the box 6 which is screwed into the adjacent wall of the channel frame 18. The head of this bolt 29 is countersunk so that it is flush with the inner surface of the adjacent side 7 and does not interfere with the sliding of the legs 2 of the pivot frame.

I claim:
1. In an adjustable wheel pivot mounting,
    a bracket frame having parallel spaced guidewalls,
    means to mount the bracket frame on a frame member of a vehicle,
    a hollow pivot support frame having opposite walls slidable and non-rotatable in said bracket frame between said guidewalls.
    a wheel pivot shaft extended across the pivot support frame and held on the walls thereof transversely to said guidewalls,
    and coacting adjusting means connected to said frames and being manipulatable for moving said pivot support frame between said guidewalls in a direction at right angles to the pivot shaft relatively to said bracket frame, thereby to adjust the location of said pivot shaft.
2. The adjustable wheel pivot mounting specified in claim 1, and
    said adjusting means including,
    a threaded member extended from said pivot support frame between said guidewalls,
    a rotatable threaded element held against relative movement on said bracket frame and threadedly engaging said threaded member, whereby said threaded member and said pivot support frame is shiftable between and parallel with said guidewalls.
3. The adjustable wheel pivot mounting specified in claim 2, and
    said pivot support frame being of substantially U-shaped cross section,
    Opposite legs of said support frame being slidable along the respective guidewalls,
    said pivot shaft being supported on said opposite legs of said pivot support frame,
    and said threaded member extending from the base of said pivot support frame of U-shaped cross section.
4. The adjustable wheel pivot mounting specified in claim 3, and
    a back plate on said bracket frame between said guide walls being spaced from the base of said pivot support frame,
    and said rotatable threaded element being supported on said back plate.
5. The adjustable wheel pivot mounting specified in claim 1, and said bracket frame being tubular, opposite side walls on said pivot support frame, said wheel pivot shaft extending across said pivot support frame, and being supported on said side walls, said side walls being slidable in said bracket frame in directions at right angles to the axis of said pivot shaft.

6. The adjustable wheel pivot mounting specified in claim 1, and said bracket frame being of substantially rectangular cross-section, and being open at least at one end thereof, said pivot support frame being of substantially U-shaped cross section the legs thereof extending toward said open end and being slidable in said bracket frame, said wheel pivot shaft extending across said pivot support frame and being supported on the legs of said U-shaped support frame, said coacting adjusting means including a threaded member extending from the base of said U-shaped support oppositely to said legs, a fixed cross member across said bracket frame between said U-shaped frame and the other end of said bracket frame, a threaded adjustor element rotatably held in said cross member against axial movement and engageable by said threaded member whereby the rotating of adjustor element moves said threaded member and said U-shaped frame axially to adjust the position of said pivot shaft.

7. The adjustable wheel support mounting specified in claim 6, and a locking element releasably held on said cross member and engageable with said adjustor element to hold said adjustor element against rotation.

* * * * *